United States Patent [19]

Turley

[11] Patent Number: 5,275,062
[45] Date of Patent: Jan. 4, 1994

[54] WEB TENSION MEASURING DEVICE FOR USE WITH WEB COILING EQUIPMENT

[75] Inventor: John W. Turley, Oxford, Conn.

[73] Assignee: T. Sendzimir, Inc., Waterbury, Conn.

[21] Appl. No.: 743,451

[22] Filed: Aug. 9, 1991

[51] Int. Cl.$^5$ .............................................. G01L 5/00
[52] U.S. Cl. ........................... 73/862.474; 73/862.391
[58] Field of Search ..................... 73/862.041, 862.042, 73/862.044, 862.045, 862.474, 862.473, 862.472, 862.471, 862.451

[56] References Cited

U.S. PATENT DOCUMENTS

| | | | |
|---|---|---|---|
| 3,186,220 | 6/1965 | Flinth | 73/862.042 |
| 3,204,454 | 9/1965 | Friman et al. | 73/862.042 |
| 4,549,701 | 10/1985 | Lucas | 73/862.474 |

OTHER PUBLICATIONS

W. L. Roberts, "Cold Rolling of Steel", pp. 214–215.
E. Angeid, "Strip Stiffness as the Deciding Factor...", Iron and Steel Engineer Yearbook, 1964, pp. 281–291.
V. O. Sorokin, "Design and Operation of Tensiometers" Iron and Steel Engineer Yearbook, 1961, 458–462.
K. A. Petraske and R. M. Sills, "Developments in Drive Systems and Gauge Control for Reversing Cold Mills", Iron and Steel Engineer Yearbook 1961, 991–997.

Primary Examiner—Donald O. Woodiel
Assistant Examiner—R. Biegel
Attorney, Agent, or Firm—Frost & Jacobs

[57] ABSTRACT

This invention relates to devices used for measuring tension in a moving web of material at a location adjacent to a coiling device. The invention consists of a single roller over which the web passes, the roller being supported by blocks at its end which incorporate flexure elements to provide the necessary constraints to motion of the blocks, and load cells are used to detect forces arising on the blocks. A signal of tension which is independent of wrap angle of the web around the roller is determined from a single load cell signal when the coil diameter is known, and is determined from two load cell signals when coil diameter is not known. Signals of wrap angle and coil diameter can also be obtained from the two load cell signals.

2 Claims, 2 Drawing Sheets

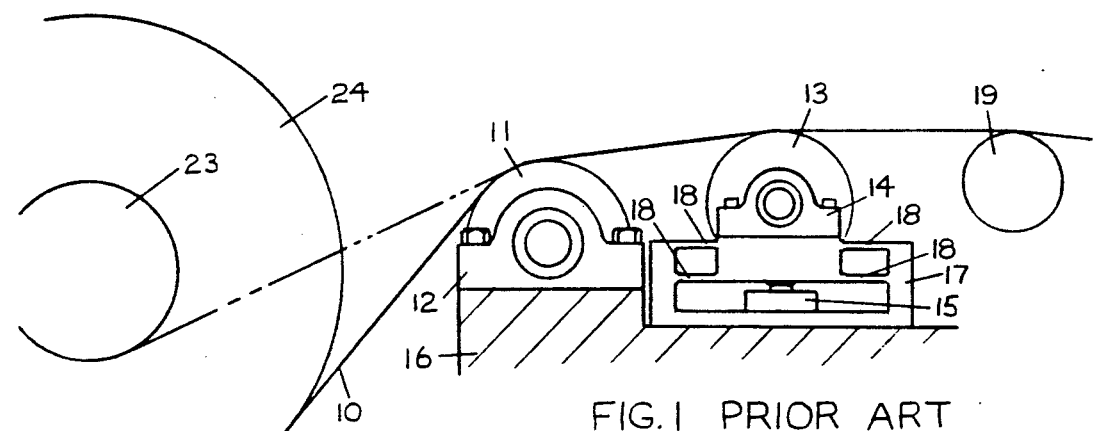
FIG. 1 PRIOR ART
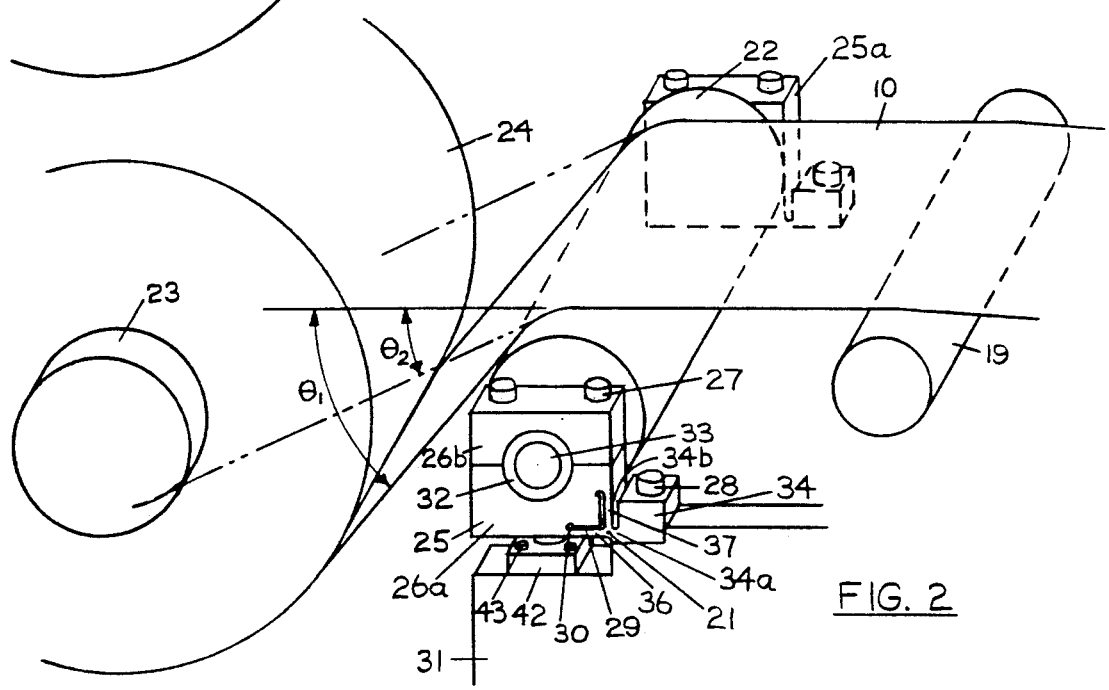
FIG. 2
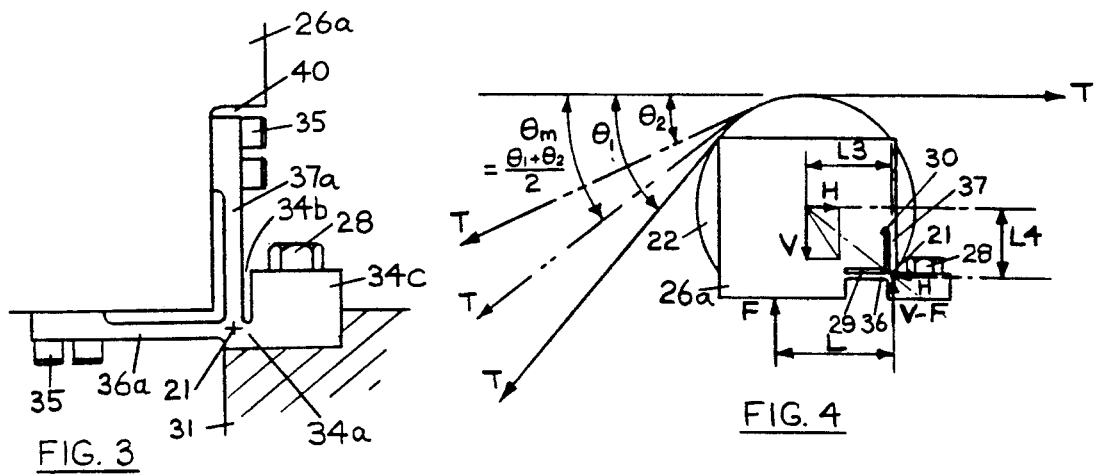
FIG. 3
FIG. 4

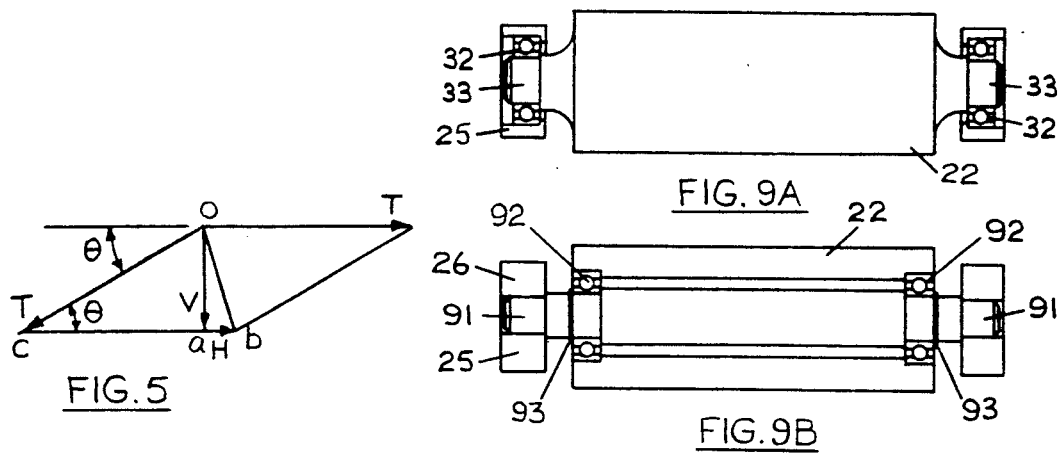
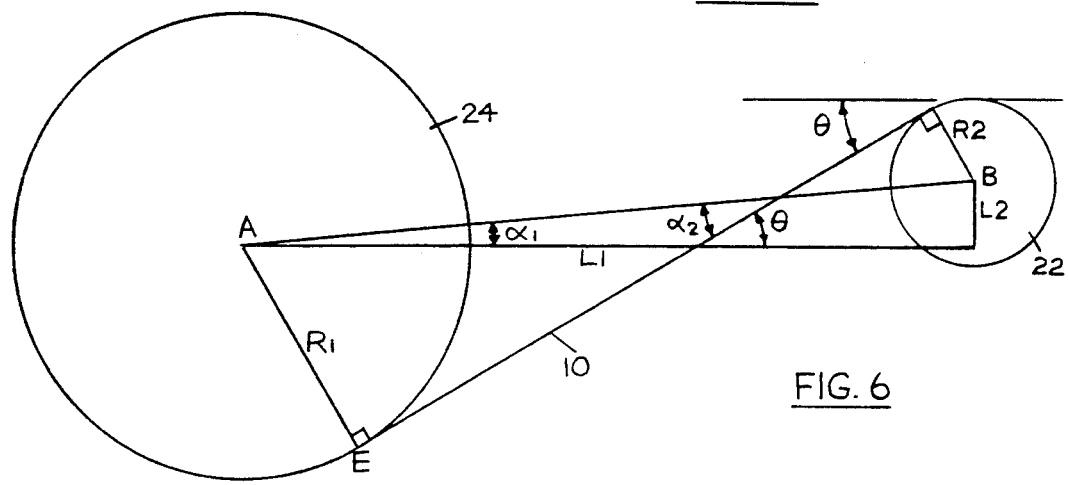
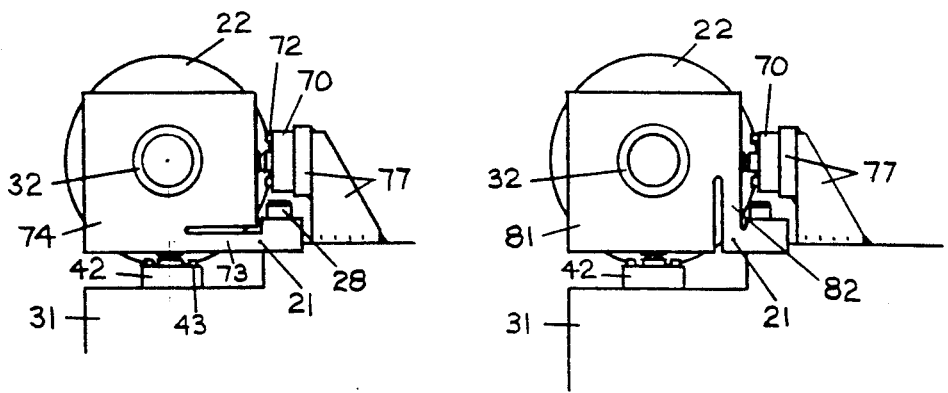

WEB TENSION MEASURING DEVICE FOR USE WITH WEB COILING EQUIPMENT

TECHNICAL FIELD

This invention relates to devices used for measuring the tension in a moving web of material and more particularly to such devices located adjacent to a coiling device.

BACKGROUND ART

Web tension measuring devices usually consist of load cells mounted underneath the bearings of a roller over which the web passes with a certain angle of wrap of the web around the roller. In locations where this angle of wrap is fixed, such an arrangement is ideal, and sufficient measurement accuracy is usually obtained.

Where tension must be measured in a location adjacent to a coiler, however, which is most often the case when coiling or uncoiling tensions have to be measured, the wrap angle of the web over rollers adjacent to the coil varies as the coil builds up. In such cases the usual solution is to use a second roller placed with its axis parallel to the first roller, which is adjacent to the coiler and a little further away from the coiler than the first roller, so that the web will pass over the second roller with a fixed wrap angle. It is then possible to mount load cells underneath the bearings of the second roller, and the signal output from the load cells is then a direct measure of the web tension, and is not affected by the variation in web wrap angle over the first roller. Such an arrangement is shown in FIG. 1.

This solution is technically satisfactory, but suffers a number of disadvantages. Firstly, the use of a second roller means that the wrap angle of the web is smaller on both rollers than would be the case if a single roller was used. Since such rollers are normally driven by the web as it passes over them, skidding of the web over the rollers is much more likely—such skidding can cause marking of the web surface, and can even cause drive instability if line speed measuring devices are driven from one of these rollers.

Secondly, the initial cost of the equipment increases not only by the cost of the second roller, but also by the cost of the additional support structure and foundations required to support it.

Thirdly, in the case of reversing machines where the web traverses back and forth between the coilers, as is true of reversing rolling mills, the loss of material at the ends of the coil is in direct proportion to the distance between the machine and each coiler. Since the insertion of the second roll inevitably increases the distance between machine and coiler, there is a resultant yield loss for every coil processed by such a machine.

SUMMARY OF THE INVENTION

The present invention provides means for measuring web tension using a single roller adjacent to the coiler and load cell means in association with said roller, wherein the effect of the variation in the wrap angle of the web around the roller is minimal, and where a small wrap angle compensation signal can be provided, if required, based upon a knowledge of current coil diameter.

Since the operation of most coiler drive systems (which apply tension to the web) usually require measurement or computation of current coil diameter for their operation, it is a simple matter to apply the necessary correction to the load cell signal in order to obtain a tension signal which is substantially independent of wrap angle. In cases where such high accuracy is not needed, it would not be necessary to supply such a wrap angle compensation signal.

BRIEF DESCRIPTION OF THE DRAWINGS

FIG. 1 is a fragmentary elevational view of a tension measuring device of the two roller variety according to the prior art.

FIG. 2 is a fragmentary isometric view of a single roller tension measuring device according to the present invention.

FIG. 3 is a fragmentary elevational view of another embodiment of the flexure pivot arrangement of the present invention.

FIG. 4 is a diagrammatic view of a device according to the present invention showing the various forces.

FIG. 5 is a force diagram corresponding to FIG. 4.

FIG. 6 is a diagram illustrating position relationships between the single roller and the coiler, corresponding to FIG. 4.

FIG. 7 is a fragmentary elevational view of a second embodiment of the present invention.

FIG. 8 is a fragmentary elevational view of a third embodiment of the present invention.

FIGS. 9A and 9B are plan views showing roller arrangements for use in the present invention.

DETAILED DESCRIPTION OF THE INVENTION

Reference is first made to FIG. 1 wherein an exemplary prior art tension measuring assembly adjacent a coiling device is illustrated. The web 10 passes over two rollers 11 and 13 and is coiled on mandrel 23, forming coil 24. When the web is moving to the left as viewed in FIG. 1, the coil builds up in diameter (coiling), and when the web moves to the right as viewed in FIG. 1, the coil diameter reduces (uncoiling).

Guide 19 determines the path of the web to the right of roller 13. Guide 19 could be a mill roll, a calendar roll or any roll or guide associated with web processing, but should be maintained at a substantially fixed position to enable the two-roller tension measuring device to work.

Roller 11, known as the deflector roll, is rotatably mounted on two pillow blocks (one at each end of the roller), one of which is shown at 12. The pillow blocks are mounted on base 16. Roller 13, known as the measuring roll, is similarly mounted on two pillow blocks (one of which is shown at 14), each of which is mounted on load cell support frame 17. Support frame 17 is mounted on base 16. Support frame 17 includes four flex elements 18 which provide stiff support of pillow block 14 in the horizontal direction, but flexible support in the vertical direction, thus ensuring that the vertical force on roller 13 is transmitted through the structure to load cells (one of which is shown at 15) located within load cell support frame 17 at each end of roller 13. With this configuration, having a fixed wrap angle of the web over roller 13, regardless of speed or direction of movement of the strip, the force on the load cells will be proportional to the tension on the strip.

FIG. 2 illustrates a web tension measuring assembly according to the present invention. Like parts have been given like index numerals. In the embodiment of FIG. 2 web 10 passes over one roller 22, and is coiled on mandrel 23, forming coil 24. Guide 19 is mounted in fixed position so that the wrap angle of the web over roller 22 depends solely upon the current diameter of the coil, the horizontal and vertical distances between axes of coil 24 and roller 22, and the diameter of roller 22. Of these, only the current diameter of the coil varies (for a given installation).

The roll neck 33 of roller 22 is mounted in bearing 32 in a split support block generally indicated at 25 and consists of a lower block 26a and an upper block 26b, blocks 26a and 26b being attached together by bolts 27. Lower block 26a is attached to base 31 by bolt 28 passing through an extension 34 integrally connected to lower block 26a by narrow portion 34a formed by notch 34b. Load cell 42 is mounted underneath lower block 26a, said load cell being attached to base 31 by bolts 43. Thus roller 22 fulfills the dual function of deflector roll and measuring roll.

A flexure pivot is provided at point 21, which is below and on the side opposite the coiler side of the axis of roller 22, by machining slot 29 in lower block 26a, thus forming vertical flex member 37 (which is stiff in a vertical plane, but flexible in a horizontal plane) and horizontal flex member 29 (which is stiff in a horizontal plane, but flexible in a vertical plane). The neutral axes of these two flex members meet at point 21 as shown. This flexure pivot allows one degree of freedom only—rotation of the support block 25 around pivot point 21. The pivot axis at point 21 is parallel to the axis of roller 22. It is envisaged that the slot 29 would be machined by the "wire EDM" method, using an electrical discharge machine manufactured by such companies as SODICK, Inc. of Rolling Meadows, IL. In this case it is necessary to drill a hole 30 in lower block 26a to enable the wire to be threaded before the slot is cut.

It will be understood that the other neck (not shown) of roller 22 is mounted in a bearing (not shown) identical to bearing 32 in a split support block generally indicated at 25a, identical to split support block 25.

Alternate methods of achieving a flexure pivot at point 21 are shown in FIGS. 3 and 4. In FIG. 3 the flexure pivot arrangement is achieved without the need to cut a slot such as slot 29 of FIG. 2 by providing an extension 34c (equivalent to extension 34 of FIG. 2) and flex members 36a and 37a (equivalent to flex members 36 and 37 of FIG. 2) constituting a separate element bolted to lower block 26a. To this end, lower block 26a is notched as shown at 40. The extension 34c is bolted to base 31 by bolt 28. Flex members 36a and 37a are attached to member 26a by bolts 35. A pivot point at point 21 (intersection point of the neutral axes of vertical and horizontal flex members 36a and 37a) is obtained as before. The location of the pivot point is important in achieving a tension measuring device which is minimally affected by the wrap angle of the strip over roller 22.

The embodiment of FIG. 4 is quite similar to that of FIG. 2. The embodiment of FIG. 4 differs from that of FIG. 2 primarily in that the top of extension 34 rather that the bottom is connected directly to the juncture of flex members 36 and 37 and the lower block 26a is notched as at 41.

In FIGS. 5 and 6 diagrams are presented of the forces acting upon the structure of the tension measuring device. To this end, web tension is indicated by T, wrap angle is indicated by $\theta$, which has a maximum value of $\theta 1$ (full coil), a minimum value of $\theta 2$ (empty mandrel) and a mean value of $$\theta m = (\theta_1 + \theta_2)/2$$

FIG. 5 depicts a rhombus, wherein the force vector T constitutes all the sides. The vertical component of force V is the segment o-a, and has the value V = T sin $\theta$. The horizontal component of force X is the segment c-a, and and has the value X = T cos $\theta$. The horizontal component of force H is the segment a-b, and has the value H = T − X = T(1 − cos $\theta$). The support force provided by the load cell indicated by F, and reaction force components at the pivot are H = T(1 − cos $\theta$) in the horizontal direction and V − F = T sin $\theta$ − F in the vertical direction. The pivot axis 21 is located horizontal and vertical distances L3 and L4 respectively from the axis of roller 22, and the load cell support point is located a horizontal distance L from the pivot axis. Using this configuration, the load cell force can be calculated (by balancing moments about the pivot axis), as follows:

$$F(L) + H(L_4) - V(L_3) = 0.$$

Substituting V = T sin $\theta$ and H = T(1 − cos $\theta$), we have:

$$F/T = L3 (\sin \theta - (1 - \cos \theta)L4/L3)/L,$$

which reduces to:

$$F/T = (\sin \theta - (1 - \cos \theta)L4/L3) \text{ if } L = L3,$$

if the load cell is vertically in line with the axis of roller 22.

By equating these expressions at full coil ($\theta = \theta 1$) and empty mandrel ($\theta = \theta 2$) it can be shown that they will be equal (and therefore tension measuring device calibration will be the same) if the pivot axis 21 is located so that L3/L4 = tan $\theta$m.

In Table 1 we show values of F/T at a range of values of wrap angle, corresponding to a number of values of L3/L4, calculated using the above formula with L = L3.

TABLE 1

| L3/L4 | arctan (L3/L4) | Wrap angle | | | | | | | |
|---|---|---|---|---|---|---|---|---|---|
| | | 10° | 20° | 30° | 40° | 50° | 60° | 70° | 80° |
| | | F/T VALUES = 1/K | | | | | | | |
| 1.428 | 55 | .163 | .300 | .406 | .479 | .516 | .516 | .479 | .406 |
| 1.192 | 50 | .161 | .291 | .388 | .446 | .466 | .446 | .388 | .291 |
| 1 | 45 | .158 | .282 | .366 | .409 | .409 | .366 | .282 | .158 |
| .839 | 40 | .156 | .270 | .340 | .364 | .340 | .270 | .156 | 0 |
| .700 | 35 | .152 | .256 | .309 | .309 | .256 | .152 | 0 | −.195 |
| .577 | 30 | .147 | .238 | .268 | .238 | .147 | 0 | −.200 | −.446 |

It can be seen from Table 1 that, if arctan (L3/L4) is set equal to $\theta$m, then values of F/T at wrap angles greater and less than $\theta$m by a given amount will be equal to each other, i.e., the curve of sensitivity F/T versus $\theta$ is symmetrical about the value $\theta = \theta$m. For example, at $\theta$m = 50° select the second row of Table 1 for which arctan (L3/L4) also equals 50°. F/T values are the same at $\theta=30°$ and $\theta=70°$, both values of $\theta$ being 20° away from the 50° value of $\theta m$. In this particular case, the variation in sensitivity F/T will be from 0.388 at 30° and 70° to 0.466 at 50°. This represents a sensitivity of 0.425±9.5% over the entire coil build-up, assuming that $\theta 2=30°$ and $\theta 1=70°$. For many applications the variation of ±9.5% is quite acceptable and the output signal from the load cell can be used directly for tension indication and control.

For those applications where greater precision is required, it is necessary to apply the correction factor based upon the wrap angle.

Transposing the above equation to express tension T in terms of load cell force F, $$T = FL/[L3(\sin\theta - (1-\cos\theta) L4/L3)] \quad (i)$$

In this expression, L, L3 and L4 are constants, and $\theta$ is the only variable which is needed for the tension T to be computed from the load cell signal.

In FIG. 6 we show in diagrammatic form the strip 10 passing over roller 22 and coiling or uncoiling to or from coil 24. The coiler axis A is distanced L1 horizontally and L2 vertically down relative to the axis B of roller 22. The strip intersects AB at C, and is assumed to form a straight line from D on the circumference of roller 22 to E on the circumference of coil 24. The roller radius is designated R2 and the coil radius is designated R1. By examination of FIG. 6 it can be seen that:

$$Distance\ AB = L1^2 + L2^2$$

$$\alpha 1 = arctan\ (L2/L1)$$

$$AC = AB\left(\frac{R1}{R1+R2}\right);$$

$$\alpha 2 = arcsin\ (R1/AC);$$

$$\theta = \alpha 1 + \alpha 2 \text{ -or-}$$

$$\theta = arctan(L2/L1) + arcsin[(R1+R2)/L1^2+L2^2] \quad (ii)$$

In this expression L1, L2, and R2 are constants, and R1 is the only variable, so $\theta$ can be evaluated for any value of coil radius R1.

It is envisaged that coil radius R1 will be sensed and computer means will be used to evaluate the wrap angle $\theta$, using equation (ii). The computer means will then be used to evaluate the strip tension using the load cell force signal F, the current value of wrap angle $\theta$, and equation (i). In this way a tension signal independent of wrap angle can be obtained.

It is also possible to manipulate the equations in a different way. For example, when the wrap angle of the strip reaches a value of $\theta R = \arctan (L3/L4)$ then equation (i) reduces to $$T = FL\ \sin\theta R/[L4(1-\cos\theta R)]$$

or $$T = KF \text{ where } K = \frac{L\sin\theta R}{L4(1-\cos\theta R)}$$

The tension T consists of two components, KF and $T_{trim}$. $T = KF + T_{trim}$, where KF is independent of wrap angle, and $T_{trim}$ varies with wrap angle; $T_{trim}$ is used as a correction value.

A signal of tension T generated by multiplying the load cell signal by constant K using a fast analog multiplier can be used to provide a quickly responding tension signal. This signal can be trimmed by a correction signal which is updated at slower intervals as the coil changes in size.

The correction signal would have the form:

$$T_{trim} = FL/[L3(\sin\theta - (1-\cos\theta)L4/L3)] - KF$$

so that, when added to the quick response signal KF, it will give the correct signal of tension T according to equation (i).

In all the above analysis it is assumed that the load cell signal F represents the combined output from the two load cells, one mounted at each end of roller 22. Differences between the two load cell signals, as is known in the art, can be used to detect tension imbalance from edge to edge of the web.

It is not absolutely required that the pivot axis is located exactly at a point where $L3/L4 = \tan\theta m$. Such points simply give equal values of F/T (load cell output/tension) at empty mandrel and full coil, so that, for a given range of wrap angle, $\theta 1-\theta 2$ give the smallest variation in F/T. Because of design constraints such as space limitations and component stress limitations, in particular cases it may not be possible to locate the pivot center at such a point. Provided it can be located close enough so that the resultant variation in F/T during coil build-up is sufficiently small, however, a different location of the pivot center would present no problem. For example, on row 1 of Table 1, if L3/L4 was set to 1.428 (=tan 55°) and the wrap angle ranged from 30° to 70° (i.e., $\theta m = 50°$), the variation in F/T from 0.406 to 0.516 (+12.7%) would be acceptable in many cases. With wrap angle compensation such a variation would be even less significant.

As a general rule then, the value of L3/L4 should be selected so that $\theta R$ (=arctan (L3/L4)) has a value between $\theta 2$ and $\theta 1$, corresponding to wrap angles for empty mandrel and full coil respectively, and $\theta R$ should be as close as possible to $\theta m$.

If rows 4-6 of Table 1 are examined, it is seen that, for very large wrap angles, the values of F/T can drop to zero or even become negative. It is best to avoid this condition, because a universal load cell would be required rather than a compression load cell, and because values of F/T are changing rather rapidly with respect to wrap angle. From equation 1 it can be seen that F/T becomes negative when the expression ($\sin\theta - (1 \cos\theta)/L4/L3$) becomes negative. This condition can be reduced to the form L3/L4 tan ($\theta/2$). To avoid the condition, L3/L4 must always be set to a value greater than tan ($\theta 1/2$)($\theta 1$ being the maximum wrap angle).

In the above specification and drawings we have shown a coiler with underwind condition, where maximum wrap angle corresponds to full coil. It should be understood that the same principles apply to overwind condition, where maximum wrap angle corresponds to empty mandrel.

The embodiments described above are given by way of example only and are not intended to limit the scope of the invention.

In FIG. 7 we show another embodiment of our invention. In FIG. 7 each support block 74 is provided with a single flexure element 73 which allows two degrees of freedom of said support block, that is, rotation about a pivot point 21, and vertical translation. Load cell 42, mounted on base 31 using bolts 43 is vertically in line with the axis of roller 22, and measures any vertically downward force component on roller 22. Load cell 70, mounted on bracket 77 using bolts 72, is horizontally in line with the axis of roller 22, and measures any horizontal force component on roller 22. Bracket 77 is welded to and so becomes part of base 31.

In FIG. 8, an embodiment similar to that of FIG. 7 is shown, where support block 81 is provided with a single flexure element 82, which allows two degrees of freedom of said support block, that is, rotation about a pivot point 21, and horizontal translation. This arrangement, like the arrangement of FIG. 7, allows independent measurement of horizontal and vertical force components on roller 22, using load cells 70 and 42.

In the embodiments of FIGS. 7 and 8, the force diagram of FIG. 5 applies, the vertical force on load cell 42 being V/2, and the horizontal force on load cell 70 being H/2. In this configuration, V and H are measured directly by two load cells. IF T is the web tension and $\theta$ the wrap angle, $V = T \sin\theta$ and $H = T(1 - \cos\theta)$. These two simultaneous equations in T and $\theta$ can be solved to give $$T = (V^2 + H^2)/2H$$

and $\theta = \arcsin(V/T) - \arcsin[2VH/(V^2 + H^2)]$

Thus, in the embodiments of FIGS. 7 and 8, by combining the output signals of V and H from the two load cells as indicated by these two equations, a tension signal can be obtained which is independent of the wrap angle, and furthermore a signal of wrap angle itself can be obtained. A signal representing coil diameter can be derived from the wrap angle signal using this relationship:

$$R1 = (L1^2 + L2^2) \sin[\theta - \arctan(L2/L1)] - R2$$

which is obtained by transposition of equation (ii).

It is envisaged that computer means would be used to combine the respective signals as indicated by these two equations, to generate signals of web tension and wrap angle, to be used by the appropriate control or indication devices.

In all of the above embodiments, the roller 22 has integral roll necks 33, and the roll necks are fitted in bearings 32 mounted in the support blocks 25, 74, or 81, as shown in FIG. 9A, or in FIGS. 7 and 8, respectively.

The scope of the invention is not limited to such embodiments. It is possible, for example, to use a pillow block arrangement as is shown in FIG. 1 (prior art), or to use a "dead shaft" roller design, as shown in FIG. 9B, where the roller is hollow, and a stationary shaft 91 passes through the inside, coaxial with the roller. The roller rotates on two bearings 92 mounted on the shaft, located just inside the ends of the roller, retained by snap rings 93, and the shaft extends beyond the ends of the roller and would be mounted directly (without bearings) in support block 25 (FIG. 2), 74 (FIG. 7), or 81 (FIG. 8).

What is claimed is:

1. A tension measuring device for measuring tension of a web of material moving in either direction between a coiler, said coiler supporting a coil of said material, and a fixed position guide, said fixed position guide defining the path of the web on one side only of said tension measuring device, said tension measuring device comprising a single roller, said roller having two ends, said roller being positioned adjacent to said coiler, said web passing directly between said coiler and said roller on its path between said coiler and said fixed position guide, said web defining a varying wrap angle on said roller, said wrap angle varying with the diameter of the coil mounted on said coiler between a minimum and a maximum, said roller being bearing-mounted in a support block at each of its two ends, one of said support blocks including a flexure pivot at one point, said pivot located below and on said fixed position guide side of the longitudinal axis of said roller, said pivot having a pivot center with its axis parallel to the longitudinal axis of said roller, and a single load cell mounted underneath said support block, to measure the vertical force upon said support block, wherein the location of said pivot center relative to the axis of said roller is defined by a horizontal dimension L3 and a vertical dimension L4, wherein the ratio L3/L4 is selected so that it has a value greater than the tangent of half the maximum wrap angle, and less than the tangent of the maximum wrap angle.

2. A tension measuring device for measuring tension of a web of material moving in either direction between a coiler, said coiler supporting a coil of said material, and a fixed position guide, said fixed position guide defining the path of the web on one side only of said tension measuring device, said tension measuring device comprising a single roller, said roller having two ends, said roller being positioned adjacent to said coiler, said web passing directly between said coiler and said roller on its path between said coiler and said fixed position guide, said web defining a varying wrap angle on said roller, said wrap angle varying with the diameter of the coil mounted on said coiler between a minimum and a maximum, said roller being bearing-mounted in a support block at each of its two ends, one of said support blocks including a flexure pivot at one point, said pivot located below and on said fixed position guide side of the longitudinal axis of said roller, said pivot having a pivot center with its axis parallel to the longitudinal axis of said roller, and a single load cell mounted underneath said support block, to measure the vertical force upon said support block, wherein the location of said pivot center relative to the axis of said roller is defined by a horizontal dimension L3 and a vertical dimension L4, wherein the ration L3/L4 is selected so that it has a value equal to the tangent of the angle which is half the sum of the minimum and maximum wrap angles.

* * * * *